US012686076B2

(12) United States Patent
Tsukamoto et al.

(10) Patent No.: US 12,686,076 B2
(45) Date of Patent: Jul. 21, 2026

(54) LASER APPARATUS AND CONTROL METHOD

(71) Applicants: SHIMADZU CORPORATION, Kyoto (JP); OSAKA UNIVERSITY, Suita (JP)

(72) Inventors: Masahiro Tsukamoto, Suita (JP); Yuji Sato, Suita (JP); Keisuke Takenaka, Suita (JP); Ritsuko Higashino, Suita (JP); Koji Tojo, Kyoto (JP)

(73) Assignees: SHIMADZU CORPORATION, Kyoto (JP); OSAKA UNIVERSITY, Osaka (JP)

( * ) Notice: Subject to any disclaimer, the term of this patent is extended or adjusted under 35 U.S.C. 154(b) by 1019 days.

(21) Appl. No.: 17/693,953

(22) Filed: Mar. 14, 2022

(65) Prior Publication Data

US 2022/0297230 A1 Sep. 22, 2022

(30) Foreign Application Priority Data

Mar. 18, 2021 (JP) ................................. 2021-044701

(51) Int. Cl.
*B23K 26/06* (2014.01)
*B23K 26/064* (2014.01)
(Continued)

(52) U.S. Cl.
CPC ...... *B23K 26/0608* (2013.01); *B23K 26/0648* (2013.01); *B23K 26/067* (2013.01);
(Continued)

(58) Field of Classification Search
CPC ............ B23K 26/0608; B23K 26/0648; B23K 26/067; B23K 2103/10; B23K 2103/12;
(Continued)

(56) References Cited

U.S. PATENT DOCUMENTS

| | | | |
|---|---|---|---|
| 2004/0131092 A1 | 7/2004 | Nakayama et al. | |
| 2006/0021681 A1* | 2/2006 | Yamada | ............. B23K 26/0608 |
| | | | 148/565 |

(Continued)

FOREIGN PATENT DOCUMENTS

| | | |
|---|---|---|
| CN | 1678426 A | 10/2005 |
| CN | 107635749 A | 1/2018 |

(Continued)

OTHER PUBLICATIONS

JP-H10328862 Translation (Year: 1998).*

(Continued)

*Primary Examiner* — Woody A Lee, Jr.
(74) *Attorney, Agent, or Firm* — Muir Patent Law, PLLC

(57) ABSTRACT

A laser apparatus includes six first laser devices that output respective blue laser beams for preliminary heating of an object, and a second laser device that outputs an infrared laser beam for main heating of the object. At least one of a relative positional relationship and each of respective first irradiation positions of the blue laser beams is changeable, the relative positional relationship being a relative positional relationship between the respective first irradiation positions of the six first laser beams in the object and a second irradiation position of the infrared laser beam in the object.

14 Claims, 12 Drawing Sheets

(51) Int. Cl.

| | | |
|---|---|---|
| *B23K 26/067* | (2006.01) | |
| *G02B 19/00* | (2006.01) | |
| *G02B 27/10* | (2006.01) | |

(52) U.S. Cl.
CPC ..... *G02B 19/0009* (2013.01); *G02B 19/0052* (2013.01); *G02B 27/106* (2013.01)

(58) Field of Classification Search
CPC .... B23K 26/0665; B23K 26/21; B23K 26/38; G02B 19/0009; G02B 19/0052; G02B 27/106; G02B 19/009; G02B 27/1006
USPC ........................................................ 219/121
See application file for complete search history.

(56)         References Cited

U.S. PATENT DOCUMENTS

| | | | |
|---|---|---|---|
| 2007/0127123 A1* | 6/2007 | Brown ............... | G02B 27/1086 |
| | | | 359/556 |
| 2008/0030823 A1 | 2/2008 | Shida et al. | |
| 2013/0064706 A1 | 3/2013 | Schwarze et al. | |
| 2017/0297144 A1* | 10/2017 | Nakanishi .............. | H04N 23/56 |
| 2019/0009369 A1* | 1/2019 | Vorontsov .......... | B23K 26/0876 |
| 2019/0366477 A1 | 12/2019 | Morita et al. | |
| 2020/0055144 A1 | 2/2020 | Poprawe et al. | |
| 2021/0247573 A1 | 8/2021 | Wakabayashi et al. | |

FOREIGN PATENT DOCUMENTS

| | | | | | |
|---|---|---|---|---|---|
| CN | 109937131 | A | | 6/2019 | |
| EP | 3437788 | A1 | | 2/2019 | |
| GB | 2623803 | A | * | 5/2024 | ......... B23K 26/0604 |
| JP | H10-328863 | A | | 12/1998 | |
| JP | H10328862 | A | * | 12/1998 | ............ H01R 4/029 |
| JP | 4969021 | B | | 4/2012 | |
| JP | 6227216 | B | | 10/2017 | |
| JP | 2018-524178 | A | | 8/2018 | |
| JP | 2018-202450 | A | | 12/2018 | |
| JP | 2018-202478 | A | | 12/2018 | |
| JP | 2019-016639 | A | | 1/2019 | |
| JP | 2020-501008 | A | | 1/2020 | |
| JP | 6757877 | B | | 9/2020 | |
| WO | 2005/118209 | A1 | | 12/2005 | |
| WO | 2016/201326 | A1 | | 12/2016 | |
| WO | 2020/039556 | A1 | | 2/2020 | |

OTHER PUBLICATIONS

Saito et al., "Reproduction of Morpho Butterfly's Color by Dielectric Multilayer Structure", J.Vac.Soc.Jpn vol. 52, No. 4, (2009), submitted with a machine translation.

Notice of Reasons for Refusal for corresponding Japanese Patent Application No. 2021-044701 dated Mar. 29, 2024.

Office Action dated Dec. 2, 2025 for corresponding application No. CN 202210254284.1.

Office Action dated Feb. 27, 2025 for the corresponding application No. CN 202210254284.1.

* cited by examiner (A)

LASER APPARATUS AND CONTROL METHOD

BACKGROUND OF THE INVENTION

Field of the Invention

The present disclosure relates to a laser apparatus and a control method.

Description of the Background Art

Japanese Patent Laying-Open No. 2018-202478 discloses a technique of superimposing a first laser beam, which is output from a fiber laser, and a second laser beam, which is output from a diode laser and has a wavelength different from that of the first laser beam, using a mirror that causes the first laser beam to pass therethrough and reflects the second laser beam, thereby irradiating a processing object with these laser beams. The first laser beam and the second laser beam are superimposed coaxially through the mirror.

SUMMARY OF THE INVENTION

The above technique, however, does not sufficiently examine a beam profile created by two colors of laser beams.

The present disclosure has been made to solve the above problem and has an object to provide a technique capable of adjusting a beam profile of two or more types of laser beams.

A laser apparatus according to the present disclosure includes first light sources and a second light source. The first light sources output respective first laser beams for preliminary heating of an object. The second light source outputs a second laser beam for main heating of the object. At least one of a relative positional relationship and each of respective first irradiation positions of the first laser beams is changeable, the relative positional relationship being a relative positional relationship between the respective first irradiation positions of the first laser beams in the object and a second irradiation position of the second laser beam in the object.

A laser apparatus according to the present disclosure includes a first light source and a second light source. The first light source outputs a first laser beam for preliminary heating of an object. The second light source outputs a second laser beam for main heating of the object. A relative positional relationship between a first irradiation position of the first laser beam in the object and a second irradiation position of the second laser beam in the object is changeable.

A laser apparatus according to the present disclosure includes a first light source and second light sources. The first light source outputs a first laser beam for preliminary heating of an object. The second light sources output respective second laser beams for main heating of the object. At least one of a relative positional relationship and each of respective second irradiation positions of the second laser beams is changeable, the relative positional relationship being a relative positional relationship between a first irradiation position of the first laser beam in the object and the respective second irradiation positions of the second laser beams in the object.

A laser apparatus according to the present disclosure includes first light sources, a second light source, a first optical system, and a second optical system. The first light sources output respective first laser beams for preliminary heating of an object. The second light source outputs a second laser beam for main heating of the object. The first optical system collects the first laser beams. The second optical system collects the second laser beam. The first optical system and the second optical system are shifted from each other in a direction of optical axis.

A control method for a laser apparatus according to the present disclosure includes outputting first laser beams for preliminary heating of an object, outputting a second laser beam for main heating of the object, and changing at least one of a relative positional relationship between respective first irradiation positions of the first laser beams in the object and a second irradiation position of the second laser beam in the object, and each of the first irradiation positions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows a third pattern example.

DESCRIPTION OF THE PREFERRED EMBODIMENTS

Figure 1:
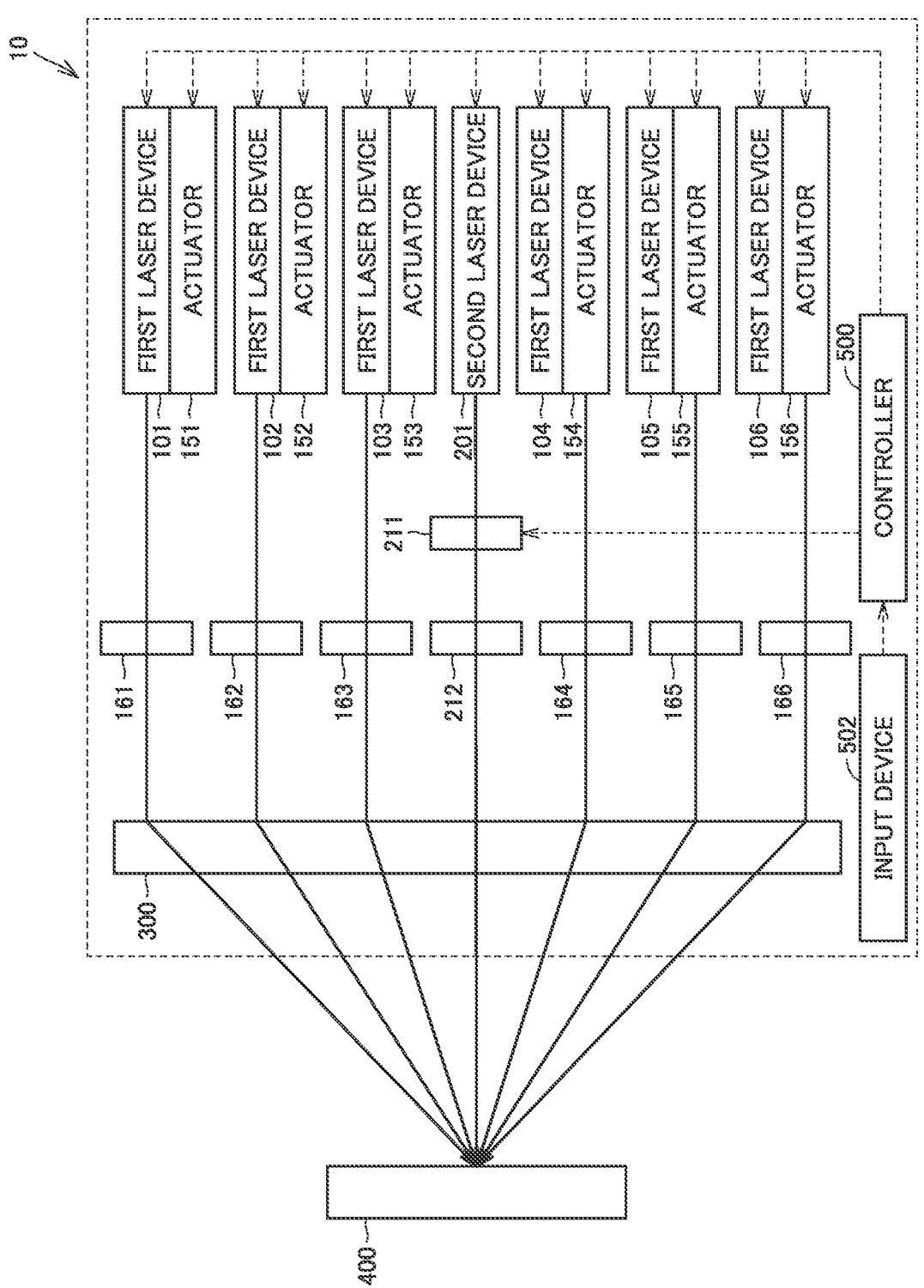
FIG. 1 shows an example configuration of a laser apparatus according to the present embodiment.

Embodiments of the present disclosure will be described below in detail with reference to the drawings. The same or corresponding parts have the same reference characters allotted, and description thereof will not be repeated.
[Processing by Laser Apparatus]

A laser apparatus according to the present embodiment irradiates an object to be processed with a laser beam to heat the object, thereby fusing and evaporating a material of the object for processing (in a specific example, welding or cutting). Depending on the quality of the material of the object, the material may be insufficiently processed due to its lower absorptivity for a wavelength of a laser beam for main heating. Thus, the laser apparatus according to the present embodiment increases the absorptivity with a laser beam for preliminary heating, and subsequently, processes a portion having the increased absorptivity with a laser beam for heating.

For example, the laser beam for preliminary heating is a blue laser beam, and the laser beam for main heating is an infrared laser beam. In this case, when the object is a specific object, the absorptivity for the infrared laser beam is low, and accordingly, the infrared laser beam is reflected off a surface of the specific object. If the infrared laser beam is reflected, the specific object cannot be processed appropriately. The specific object is made of, for example, a highly reflective material made of gold, copper, aluminum or the like. This highly reflective material has such a characteristic that the absorptivity for an infrared beam increases with an increasing temperature. Since the infrared laser beam is absorbed appropriately by the highly reflective material as the absorptivity for the infrared beam increases, even such a highly reflective material can be processed appropriately.

In the present embodiment, thus, a processing portion (a portion to be irradiated with an infrared laser beam) of the highly reflective material is irradiated with a blue laser beam, thereby locally increasing the temperature of the processing portion. Subsequently, the portion with an increased temperature (i.e., the portion in which the absorptivity for the infrared laser beam has increased) is irradiated with the infrared laser beam. As a result, even an object, which is a highly reflective material, can be processed appropriately through irradiation with the infrared laser beam. As described above, in the present embodiment, the blue laser beam is used as the laser beam for preliminary heating, and the infrared laser beam is used as the laser beam for main heating. In one conceivable configuration, both of the laser beam for preliminary heating and the laser beam for main heating are blue laser beams. However, a diode laser beam, which commonly has a poor BPP (Beam Parameter Products), such as a blue laser beam, fails to yield as minute a spot diameter as that of a single-mode fiber laser. Considering the above, a configuration in which the blue laser beam is used as the laser beam for main heating is not employed in the present embodiment.

[Overall Configuration of Laser Apparatus]

FIG. 1 shows an example configuration of a laser apparatus 10 according to the present embodiment. An object 400 is arranged on an arrangement table (not shown). Laser apparatus 10 irradiates object 400 with laser beams (a blue laser beam and an infrared laser beam). Laser apparatus 10 includes a first laser device group, an actuator group, a collimating lens group, a second laser device 201, an optical element 211, a condensing lens 300, a controller 500, and an input device 502. Condensing lens 300 corresponds to a "first optical system" of the present disclosure.

The first laser device group includes N (N is an integer of not less than one) number of first laser devices. In the present embodiment, N=6. In other words, the first laser device group includes six first laser devices. In the present embodiment, the six first laser devices are a first laser device 101, a first laser device 102, a first laser device 103, a first laser device 104, a first laser device 105, and a first laser device 106. Each of first laser devices 101 to 106 is formed of, for example, a diode laser device. Each of first laser devices 101 to 106 may be formed of any other laser device. The other laser device is, for example, a solid laser device. The first laser device corresponds to a "first light source" of the present disclosure.

Each of first laser devices 101 to 106 outputs a first laser beam. The first laser beam is typically a laser beam having a wavelength of not less than 400 nm and not greater than 550 nm. For example, the first laser beam is a so-called blue laser beam or green laser beam. In the present embodiment, the first laser beam is the blue laser beam. As described above, the blue laser beam is a laser beam for preliminary heating of object 400.

The actuator group includes N number of actuators corresponding to the respective N number of first laser devices. The actuator is also referred to as a "driving mechanism". Since N=6 as described above, the actuator group includes six actuators 151 to 156. Six actuators 151 to 156 are arranged in correspondence with six first laser devices 101 to 106, respectively. The actuator can displace an output terminal of the first laser device (e.g., an output terminal 101S of an output fiber shown in FIG. 3, which will be described below) in an XY plane, which will be described below. Thus, the actuator can drive the first laser device so as to change an irradiation position of the blue laser beam from the first laser device corresponding to the actuator in object 400. The actuator is formed of, for example, a piezoelectric element or a motor. In the present embodiment, the irradiation position refers to a position in which object 400 is irradiated with the laser beam. The irradiation position involves the concept that the irradiation position is a point-like position in object 400 which is irradiated with the laser beam and the concept that the irradiation position is an irradiation region having a certain area.

More specifically, actuator 151 drives first laser device 101. Actuator 152 drives first laser device 102. Actuator 153 drives first laser device 103. Actuator 154 drives first laser device 104. Actuator 155 drives first laser device 105. Actuator 156 drives first laser device 106.

The collimating lens group includes N number of collimating lenses corresponding to the respective N number of first laser devices. Since N=6 as described above, the collimating lens group includes six collimating lenses 161 to 166. Six collimating lenses 161 to 166 are arranged in correspondence with six first laser devices 101 to 106, respectively. The collimating lens collimates the blue laser beam from the first laser device corresponding to this collimating lens.

More specifically, collimating lens 161 collimates the blue laser beam from first laser device 101. Collimating lens 162 collimates the blue laser beam from first laser device 102. Collimating lens 163 collimates the blue laser beam from first laser device 103. Collimating lens 164 collimates the blue laser beam from first laser device 104. Collimating lens 165 collimates the blue laser beam from first laser device 105. Collimating lens 166 collimates the blue laser beam from first laser device 106.

Second laser device 201 outputs a second laser beam. The second laser beam is typically a laser beam having a wavelength of not less than 900 nm and not greater than 1100 nm. For example, the second laser beam is an infrared laser beam. The infrared laser beam is a laser beam for main heating of object 400. Second laser device 201 is, for example, a single-mode fiber laser device. Second laser device 201 may be any other device. The other device is, for example, a solid laser device or $CO_2$ laser device. The infrared laser beam is in a single mode. The second laser device corresponds to a "second light source" of the present disclosure.

Optical element 211 changes an irradiation pattern of the infrared laser beam in object 400. Optical element 211 is, for example, a DOE (Diffractive Optical Element). Optical element 211 splits the infrared laser beam into, for example, M (M is an integer of not less than two) number of parts. Controller 500 can move optical element 211 in and out of a path of the infrared laser beam. Controller 500 moves optical element 211 in and out of the path in this manner, and accordingly, can prevent the infrared laser beam from being split or cause the infrared laser beam to be split. A focusing lens 212 collects the infrared laser beam and adjusts the focus of the infrared laser beam. Focusing lens 212 corresponds to a "second optical system" of the present disclosure.

Figure 3:
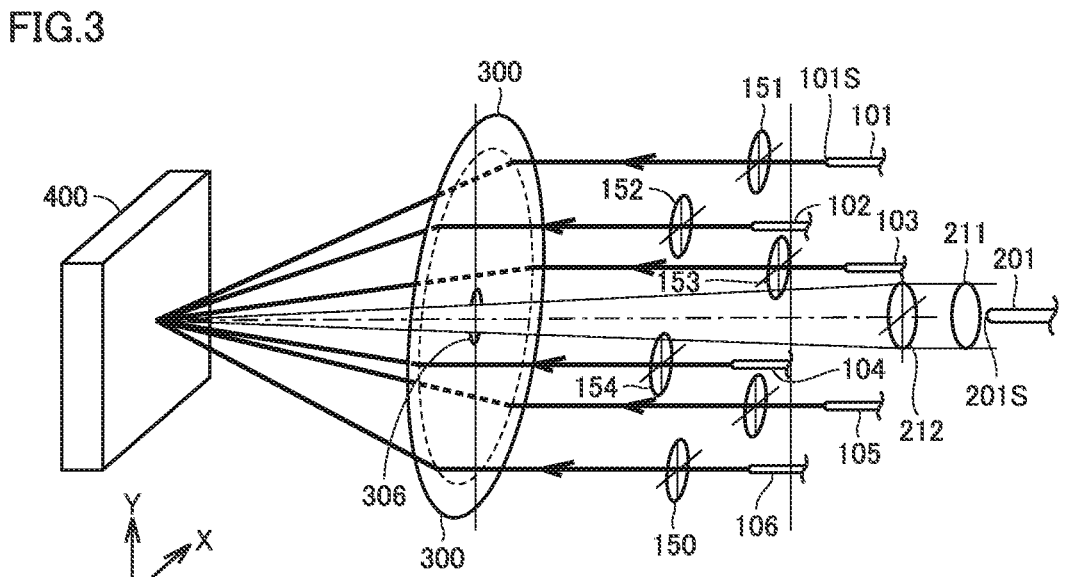
FIG. 3 is a perspective view of main components of a laser apparatus 10 and the like according to the present embodiment.

As described above, the output terminal of each of first laser devices 101 to 106 is displaceable. The example of FIG. 3 shows an output terminal 101S of each of output terminals of first laser devices 101 to 106 for brevity. In the present embodiment, no actuator is arranged in second laser device 201. An output terminal 201S of second laser device 201 is thus not displaceable.

Controller 500 controls first laser devices 101 to 106, actuators 151 to 156, second laser device 201, and optical element 211. Controller 500 controls switching between output and non-output of the blue laser beams from first laser devices 101 to 106, output powers of the blue laser beams, and the like. Controller 500 controls switching between output and non-output of the infrared laser beam from second laser device 201, output power of the infrared laser beam, and the like.

Controller 500 controls any actuator of actuators 151 to 156 to displace the output terminal of the first laser device corresponding to this actuator. The displacement of the output terminal of the first laser device changes an angle of incidence of the blue laser beam output from the first laser device with respect to condensing lens 300. Through this change, controller 500 can change (adjust) the irradiation position of the blue laser beam in object 400.

Information (instruction) from a user is input to input device 502. Input device 502 is formed of, for example, a mouse, a keyboard, a touch panel or the like. An instruction signal from input device 502 is input to controller 500. Controller 500 executes control based on the instruction signal.

Input information input by the user may include, for example, an irradiation pattern, which will be described below. For example, the irradiation pattern described below is displayed on a display device, and the user selects the displayed irradiation pattern. Through this selection, the user can input the irradiation pattern or the like. The input information may also include actuator driving information. The driving information is, for example, information indicating an amount by which the output terminal of the first laser device corresponding to the actuator is displaced, or the like. The user can use the input device to finely adjust the position of the output terminal of the first laser device.

The input information may include information indicating switching between output and non-output of the blue laser beams from first laser devices 101 to 106. The input information may also include information indicating switching between output and non-output of the infrared laser beam from second laser device 201. The input information may also include information indicating an angle of rotation of optical element 211.

The respective blue laser beams (six blue laser beams) collimated by collimating lenses 161 to 166 and the infrared laser beam with its focus adjusted by focusing lens 212 enter condensing lens 300. Condensing lens 300 collects six blue laser beams and passes one infrared laser beam, thereby irradiating object 400 with these laser beams.

Laser apparatus 10 can irradiate object 400 in a point shape or a linear shape (e.g., in a straight line or a curved line) through scanning with the infrared laser beam and the blue laser beams. When laser apparatus 10 performs scanning with the infrared laser beam and the blue laser beams, laser apparatus 10 and object 400 are moved relative to each other. For example, as an output portion (a portion that outputs the infrared laser beam and the blue laser beam, which is not shown) of laser apparatus 10 moves, laser apparatus 10 may irradiate object 400 linearly with the infrared laser beam and the blue laser beams. Laser apparatus 10 may also irradiate object 400 linearly with the infrared laser beam and the blue laser beams by moving the arrangement table (not shown) on which object 400 is arranged.

Figure 2:
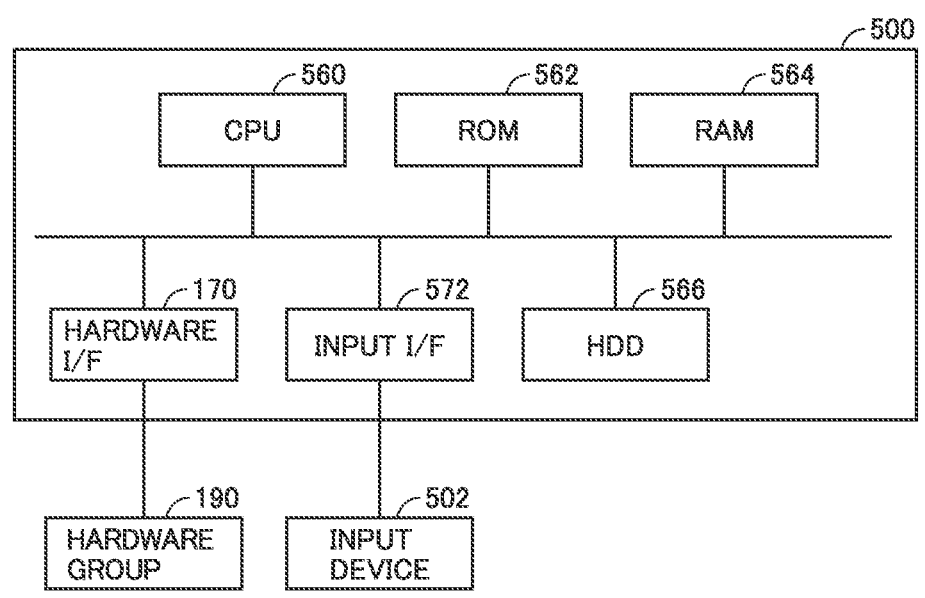
FIG. 2 is a block diagram showing a hardware configuration of a controller according to the present embodiment.

FIG. 2 is a block diagram showing a hardware configuration of controller 500. Controller 500 includes a CPU (Central Processing Unit) 560, a ROM (Read Only Memory) 562, a RAM (Random Access Memory) 564, an HDD (Hard Disk Drive) 566, a hardware I/F 170, and an input I/F 572 as main components. The components are connected to one another by a data bus.

Hardware I/F 170 is an interface for controlling a hardware group 190. Hardware group 190 includes first laser devices 101 to 106, actuators 151 to 156, second laser device 201, and optical element 211. Input I/F 572 is an interface for communication with input device 502.

ROM 562 stores a program executed by CPU 560. RAM 564 temporarily stores data or the like generated by the execution of the program in CPU 560. RAM 564 can function as a temporary data memory used as a work area. HDD 562 is a non-volatile storage device. HDD 566 may be replaced with a semiconductor storage device such as a flash memory.

The program stored in ROM 562 may be stored in a recording medium and distributed as a program product. The program may be provided by an information provider as a so-called program product downloadable over the Internet. Controller 500 reads the program provided by the recording medium, the Internet or the like. Controller 500 stores the read program in a predetermined storage area (e.g., ROM 562). CPU 560 executes the stored program to perform the display processing described above.

The recording medium is not limited to a DVD-ROM (Digital Versatile Disk Read Only Memory), CD-ROM (compact disc read-only memory), FD (Flexible Disk), and a hard disk. It may be a medium carrying a program in a fixed manner, such as a magnetic tape, a cassette tape, an optical disc (MO (Magnetic Optical Disc)/MD (Mini Disc)/ DVD (Digital Versatile Disc), an optical card, a mask ROM, an EPROM (Electronically Programmable Read-Only Memory), an EEPROM (Electronically Erasable Programmable Read-Only Memory), a flash ROM, or a semiconductor memory. The storage medium is a non-transitory medium allowing a computer to read a program or the like therefrom.

FIG. 3 is a perspective view of main components of laser apparatus 10 and object 400. In FIG. 3, first laser devices 101 to 106 and second laser device 201 are shown in the form of fibers. As shown in FIG. 3, the direction in which the blue laser beams are output from first laser devices 101 to 106 (the direction in which the infrared laser beam is output from second laser device 201) is also referred to as a Z-axis direction. In the present embodiment, both of the direction in which the blue laser beams are output from first laser devices 101 to 106 and the direction in which the infrared laser beam is output from second laser device 201 extend in the Z-axis direction, as described above. In other words, the optical axis of the infrared laser beam and the optical axes of the six blue laser beams are preferably parallel to each other in the Z-axis direction. Also, the height direction of object 400 placed in a predetermined location is a Y-axis direction, and the width direction of the object is an X-axis direction. The XY plane described above is a plane perpendicular to the Z-axis direction. Condensing lens 300 and focusing lens 212 are shifted from each other in the Z-axis direction.

In the example of FIG. 3, condensing lens 300 is circular in cross section. A hole 306 is provided in the center of condensing lens 300. Hole 306 of the present embodiment is circular in cross section. The infrared beam that has passed through focusing lens 212 passes through hole 306 to be applied to object 400. As described above, hole 306 is a pass-through portion that allows the infrared laser beam to pass therethrough.

As shown in FIG. 3, the respective positions of incidence of the six blue laser beams and the position of incidence of the infrared laser beam are different in condensing lens 300. Although the position of incidence of the infrared laser beam is a central position of condensing lens 300 in the example of FIG. 3, it may be any other position (e.g., an end of condensing lens 300).

The position of incidence of the blue laser beam from first laser device 101 in condensing lens 300 and the position of incidence of the blue laser beam from first laser device 102 in condensing lens 300 are bilaterally symmetrical. The position of incidence of the blue laser beam from first laser device 103 in condensing lens 300 and the position of incidence of the blue laser beam from first laser device 104 in condensing lens 300 are bilaterally symmetrical. The position of incidence of the blue laser beam from first laser device 105 in condensing lens 300 and the position of incidence of the blue laser beam from first laser device 106 in condensing lens 300 are bilaterally symmetrical.

Figure 4:
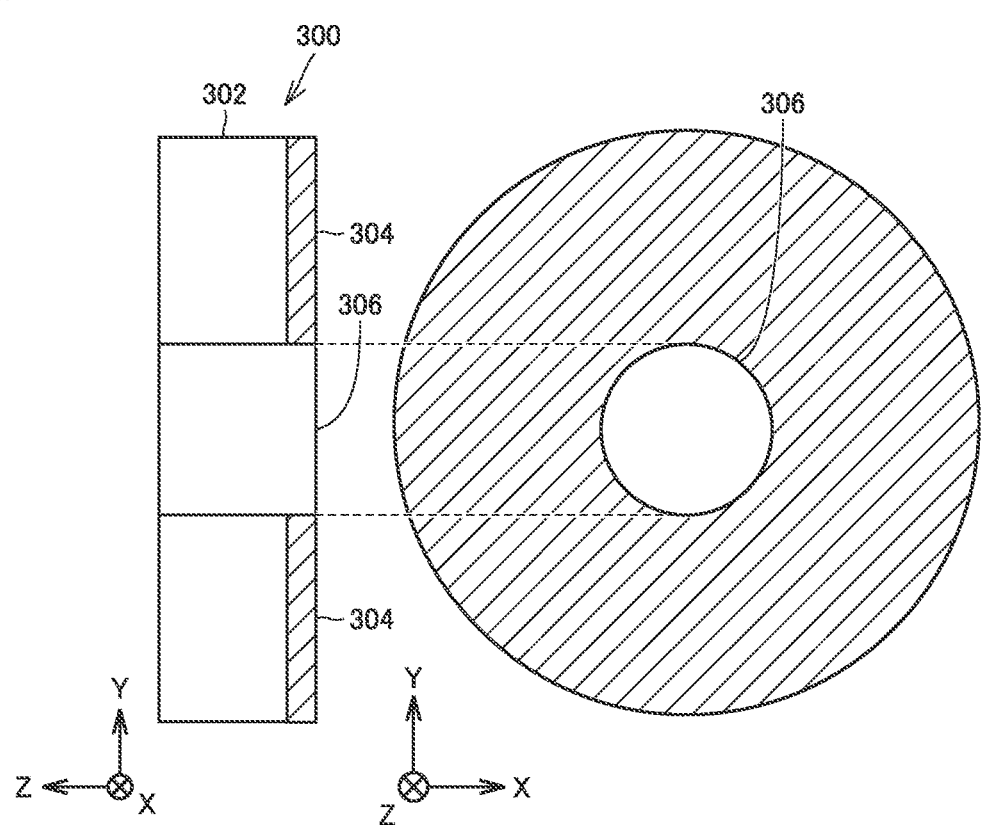
FIG. 4 shows an example condensing lens.

FIG. 4 shows an example of condensing lens 300. Condensing lens 300 includes a lens body 302 and a first layer 304 formed on a surface of lens body 302. Although FIG. 4 shows an example in which first layer 304 is formed on one surface of condensing lens 300, it may be formed on the opposite surfaces of condensing lens 300. First layer 304 is a layer with a low reflectivity of the blue laser beam. First layer 304 is, for example, a dielectric multilayer film. First layer 304 is formed by lamination of titanium dioxide ($TiO_2$) and silicon dioxide ($SiO_2$). The lamination number may be one or not less than two. As first layer 304 is formed over the entire surface of lens body 302, the infrared laser beam does not enter condensing lens 300 appropriately. In the present embodiment, thus, the pass-through portion (in the present embodiment, hole 306) for causing the infrared laser beam to pass therethrough is formed in a predetermined region (in the present embodiment, the central region) of condensing lens 300. Accordingly, both of the blue laser beams and the infrared laser beam can enter condensing lens 300.

As described above, the infrared laser beam can be split by optical element 211. Irrespective of whether the infrared laser beam is split or not, the diameter of hole 306 is set such that the whole infrared laser beam passes through hole 306.

[Change of Irradiation Positions]

Laser apparatus 10 of the present embodiment can change the relative positional relationship between the respective first irradiation positions of six blue laser beams and the second irradiation position of an infrared laser beam in object 400. In the present embodiment, controller 500 controls actuators 151 to 156 to change the relative positional relationship.

Figure 5:
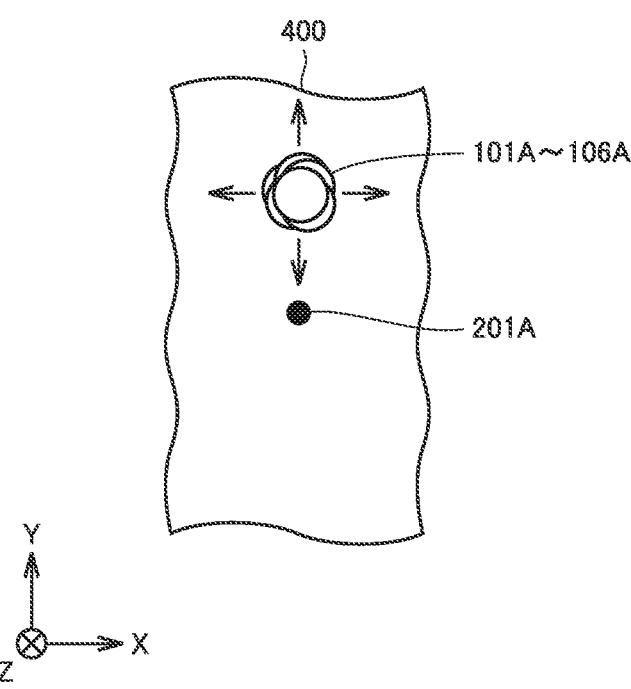
FIG. 5 shows a change of a relative positional relationship.

FIG. 5 is a view for illustrating a change of a relative positional relationship. FIG. 5 shows first irradiation positions 101A to 106A of the blue laser beams in object 400 and second irradiation position 102A of the infrared laser beam in object 400. First irradiation positions 101A to 106A are irradiation positions of the blue laser beams output from first laser devices 101 to 106, respectively. Second irradiation position 201A is an irradiation position of the infrared laser beam output from second laser device 201.

Laser apparatus 10 can change the relative positional relationship between first irradiation positions 101A to 106A and second irradiation position 201A. As described above, output terminal 201S of second laser device 201 is not displaceable. Laser apparatus 10 can thus change (move) first irradiation positions 101A to 106A relative to second irradiation position 201A.

Figure 6:
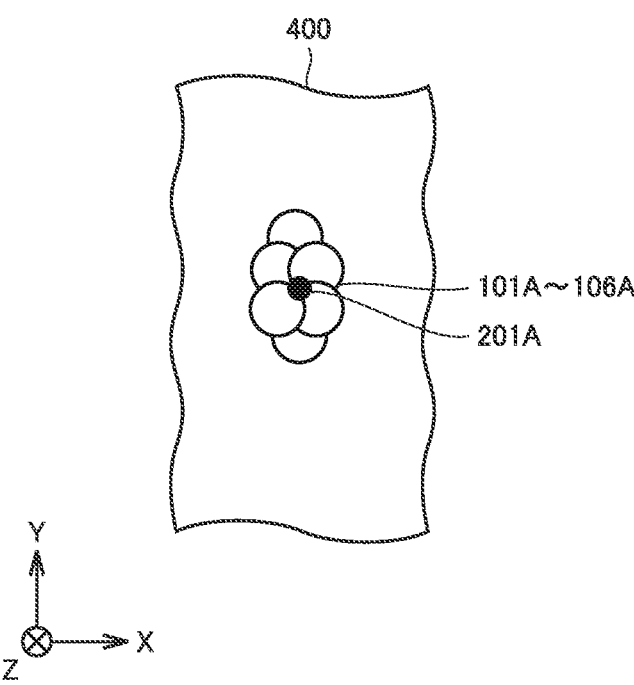
FIG. 6 shows a change of an individual position.

Further, laser apparatus 10 can individually change six first irradiation positions 101A to 106A. Each of first irradiation positions 101A to 106A is also referred to as an "individual position". A region formed by first irradiation positions 101A to 106A can be changed by changing the individual positions. FIG. 6 shows that each position (individual position) of six first irradiation positions 101A to 106A is displaceable. The example of FIG. 6 shows an elliptical region as a region formed by first irradiation positions 101A to 106A. The example of FIG. 5 shows a region formed by superimposition of the respective parts of first irradiation positions 101A to 106A. The region shown in FIG. 5 can be changed to the region of another shape (in the example of FIG. 6, an elliptical region) by changing the individual positions. In this manner, the user can change a region formed by first irradiation positions 101A to 106A. For example, the user can change this region to a rectangular region or any other region.

In the present embodiment, laser apparatus 10 can change (adjust) both of the relative positional relationship and the individual positions. In a variation, laser apparatus 10 may be configured to change (adjust) any one of the relative positional relationship and each of the individual positions.

In the present embodiment, a position to be changed can be changed as controller 500 drives actuator 151 to actuator 156. Specifically, controller 500 can change (move) first irradiation positions 101A to 106A by driving actuator 151 to actuator 156.

Laser apparatus 10 may be configured to individually change first irradiation positions 101A to 106A and second irradiation position 201A. Alternatively, laser apparatus 10 may be configured to change second irradiation position 201A relative to first irradiation positions 101A to 106A.

Controller 500 can change the relative positional relationship based on a predetermined irradiation pattern. Herein, the irradiation pattern includes a first pattern to a fourth pattern. Data on the irradiation pattern is preliminarily stored in, for example, ROM 562 described above.

Figure 7:
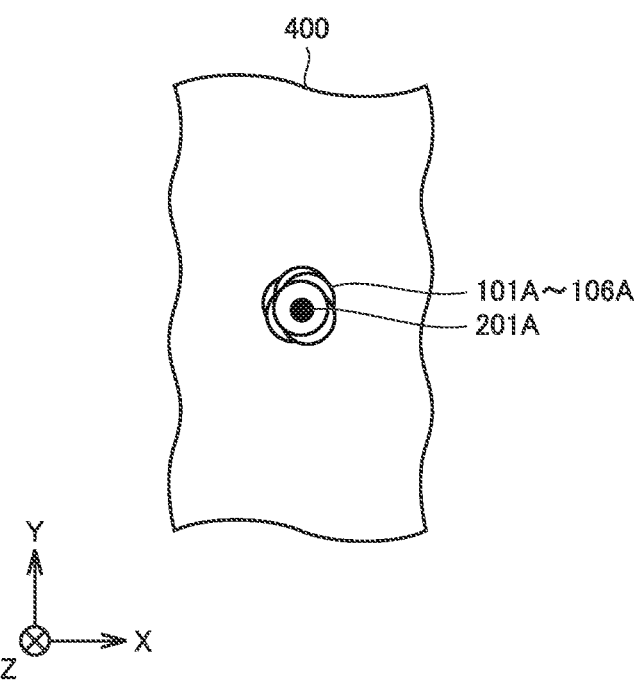
FIG. 7 shows a first pattern example.

FIG. 7 shows an example of the first pattern. The first pattern is a pattern in which first irradiation positions 101A to 106A and second irradiation position 201A are superimposed, as shown in FIG. 7. The first pattern is a pattern in which an irradiation timing of the blue laser beam (an arrival timing of the blue laser beam) for object 400 is the same as an irradiation timing of the infrared laser beam (an arrival timing of the infrared laser beam) for object 400.

Figure 8:
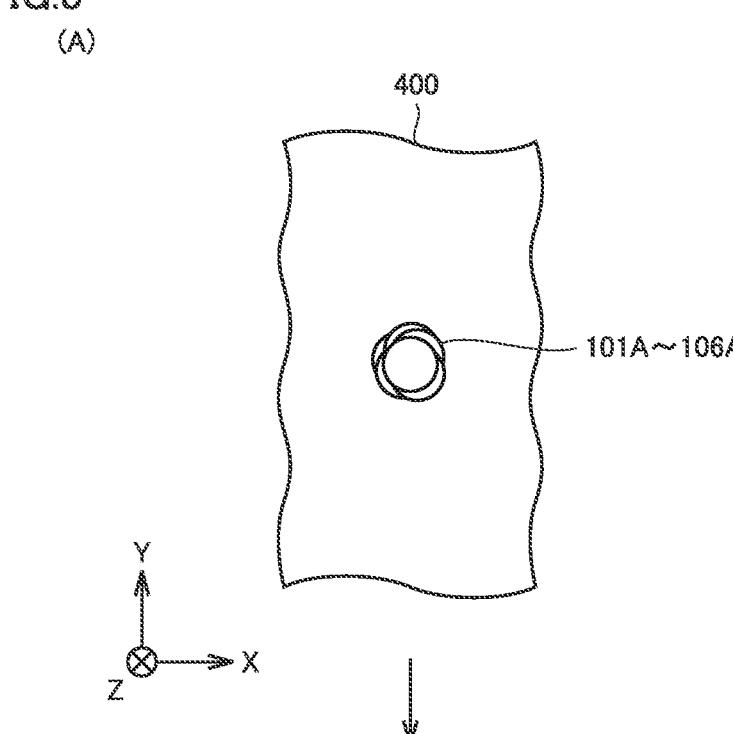
FIG. 8 shows a second pattern example.
Figure 8:
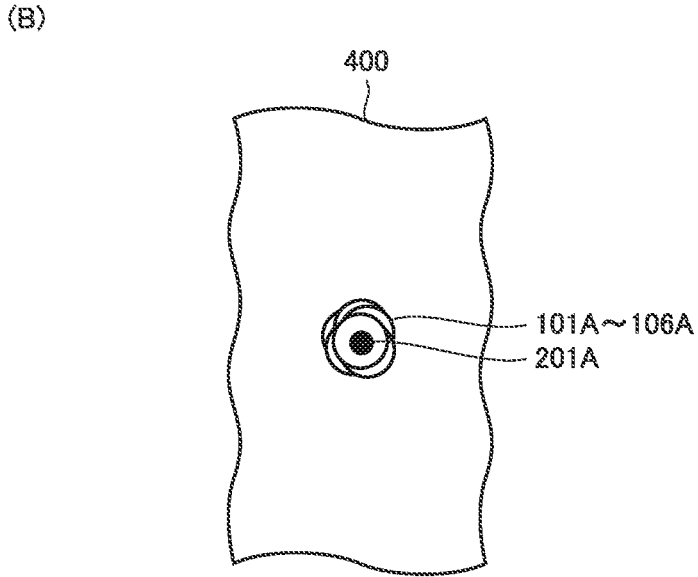

FIG. 8 shows an example of the second pattern. In the second pattern, at least one blue laser beam of six blue laser beams is first applied, as shown in Part (A) of FIG. 8. The example of Part (A) of FIG. 8, which shows six first irradiation positions 101A to 106A, indicates that all the six laser beams are applied. Then, after a lapse of a predetermined period of time with the application of the blue laser beam kept, first irradiation positions 101A to 106A are irradiated with the infrared laser beam, as shown in Part (B) of FIG. 8.

As described above, the second pattern is a pattern in which object 400 is irradiated with one or more blue laser beams six blue laser beams, and subsequently, first irradiation positions 101A to 106A are irradiated with the infrared laser beam. Thus, first irradiation positions 101A to 106A of object 400 are locally heated through irradiation with the blue laser beams, as shown in Part (A) of FIG. 8. The temperatures of the locally heated positions (i.e., first irradiation positions 101A to 106A) increase, resulting in an increase in the absorptivity for the infrared laser beam in these positions. Thus, the positions can be irradiated with the infrared laser beam as shown in Part (B) of FIG. 8 to cause the infrared laser beam to be absorbed in the positions, enabling main heating in these positions.

Figure 9:
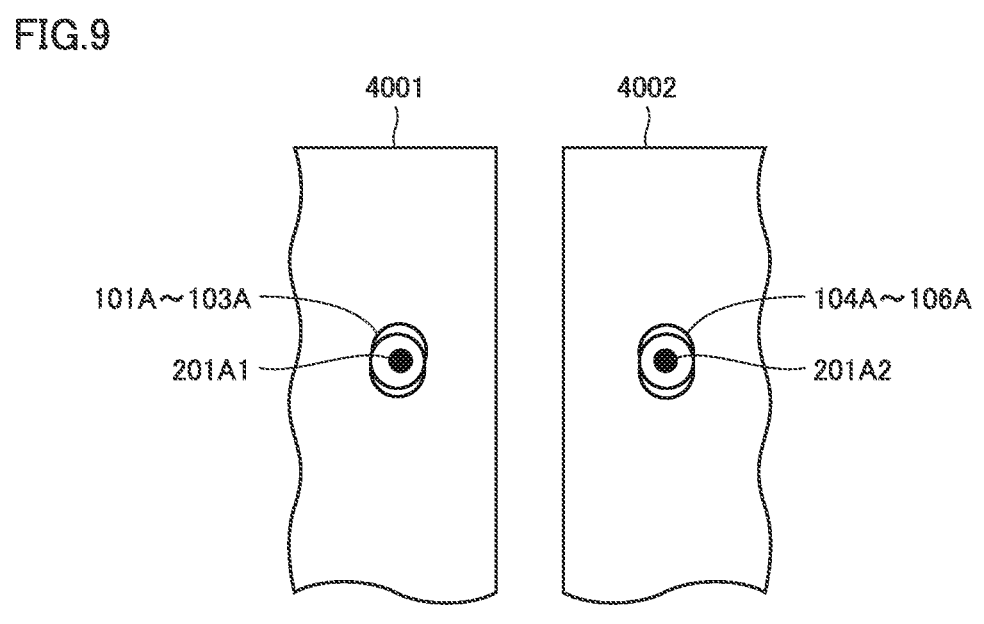

FIG. 9 shows an example of the third pattern. Description has been given of the configuration in which one object 400 is irradiated with the blue laser beams and the infrared laser beam. The third pattern is a pattern in which each of a plurality of objects is irradiated with the blue laser beams and the infrared laser beam. The example of FIG. 9 shows two objects, that is, an object 4001 and an object 4002, as the plurality of objects.

In the third pattern of the example of FIG. 9, a second irradiation position 201A1 of object 4001 is irradiated with the infrared laser beam. A position corresponding to second irradiation position 201A1 is irradiated with some blue laser beams of six blue laser beams. Herein, the position corresponding to the second irradiation position may be a position superimposed on the second irradiation position or a position distant from the second irradiation position by a certain distance. In the example of FIG. 9, the position corresponding to second irradiation position 201A1 is a position superimposed on second irradiation position 201A1. In the example of FIG. 9, some blue laser beams of six blue laser beams are the respective blue laser beams output from first laser devices 101 to 103. The example of FIG. 9 thus shows first irradiation positions 101A to 103A in object 4001.

In the example of FIG. 9, second irradiation position 201A2 of object 4002 is irradiated with the infrared laser beam. Also, the position superimposed on second irradiation position 201A2 is irradiated with some blue laser beams of six blue laser beams. These blue laser beams are the respective blue laser beams output from first laser devices 104 to 106. The example of FIG. 9 thus shows first irradiation positions 104A to 106A in object 4002.

Figure 10:
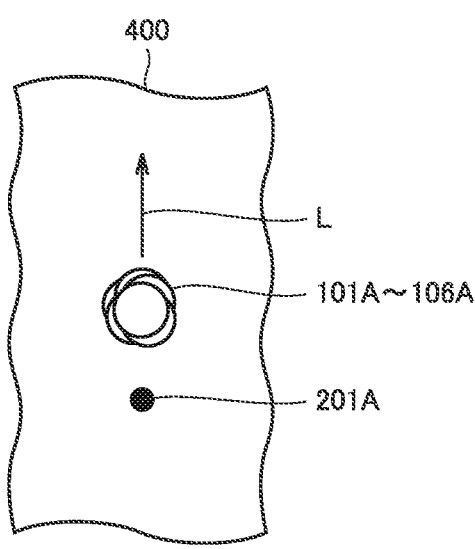
FIG. 10 shows a fourth pattern example.

FIG. 10 shows an example of the fourth pattern. The fourth pattern is, for example, a pattern used when object 400 is scanned linearly (e.g., in a straight line or a curved line) with the infrared laser beam and the blue laser beams. In the example of FIG. 10, the infrared laser beam and the blue laser beams are used for scanning along a line L. In the fourth pattern, also, the first irradiation positions (in the example of FIG. 10, first irradiation positions 101A to 106A) are set on the scanning direction (in the example of FIG. 10, line L direction) side in object 400 relative to second irradiation position 201A.

Through this setting, object 400 is scanned with the blue laser beams and the infrared laser beam in a line L shape. Also, the blue laser beams are applied before the infrared laser beam in line L. In line L, accordingly, the infrared laser beam can be applied after local heating with the blue laser beams.

The idea of the fourth pattern may be reflected on the third pattern. In this case, "the position corresponding to the second irradiation position" described above is a position distant from the second irradiation position by a certain distance. Specifically, in this pattern, second irradiation position 201A1 is distant from first irradiation positions 101A to 103A by a certain distance, and second irradiation position 201A2 is distant from first irradiation positions 103A to 106A by a certain distance.

Laser apparatus 10 is configured to allow a user to select an irradiation pattern, for example, from a irradiation pattern including the first to fourth patterns. For example, the user can operate input device 502 to select any of the first to fourth patterns.

For a conventional laser apparatus, a beam profile is not studied. In contrast, laser apparatus 10 of the present embodiment is configured to change the relative positional relationship between first irradiation positions 101A to 106A of the respective blue laser beams in object 400 and second irradiation position 201A of the infrared laser beam in object 400 and each of the respective positions (positions to be changed) of six first irradiation positions 101A to 106A. Accordingly, the beam profile of the infrared laser beam and the blue laser beams can be varied.

Controller 500 is configured to change a position to be changed. Accordingly, the relative positional relationship can be changed easily compared with the configuration in which the user changes the relative positional relationship.

Laser apparatus 10 includes input device 502 that receives an input of the irradiation pattern from the user. Controller 500 changes a position to be changed, based on the received irradiation pattern. The user can thus change, for example, a position to be changed, in a frequently used irradiation pattern. This reduces a burden on the user.

The third pattern of the irradiation pattern is a pattern in which some blue laser beams of six blue laser beams are applied to the respective positions corresponding to second irradiation positions 201A1 and 201A2 of the infrared laser beam split by optical element 211, as shown in FIG. 9. Thus, laser apparatus 10 can concurrently process a plurality of objects, for example.

The second pattern and the fourth pattern of the irradiation pattern are patterns in which object 400 is irradiated with one or more blue laser beams of six blue laser beams, and subsequently, the first irradiation positions of the one or more blue laser beams with the infrared laser beam, as shown in FIGS. 8 and 10. Thus, the infrared laser beam is applied after local preliminary heating with the blue laser beam(s). Accordingly, even object 400, which has a high reflectivity of the infrared laser beam, can be processed with this infrared laser beam.

Laser apparatus 10 further includes condensing lens 300 that collects a plurality of blue laser beams and causes the plurality of first laser beams to be applied to object 400. The pass-through portion that causes the infrared laser beam to pass therethrough is formed in condensing lens 300, and the infrared laser beam that has passed through the pass-through portion is applied to object 400. Laser apparatus 10 can accordingly collect the plurality of blue laser beams and the infrared laser beam using condensing lens 300 to radiate object 400 with these laser beams.

As shown in FIG. 4 and the like, the pass-through portion formed in condensing lens 300 is hole 306. Accordingly, the infrared laser beam can be caused to pass through condensing lens 300 with a relatively simple configuration.

First laser devices 101 to 106 are diode laser devices. The blue laser beam can thus be applied to object 400 by an existing diode laser device.

Second laser device 201 is a single-mode fiber laser device. The infrared laser beam can thus be applied to object 400 by an existing single-mode fiber laser device.

The first laser beam, which is a blue laser beam by way of example, is a laser beam having a wavelength of not less than 400 nm and not greater than 550 nm, and the second laser beam, which is an infrared laser beam by way of example, is a laser beam having a wavelength of not less than 900 nm and not greater than 1100 nm. Object 400 is made of copper, gold, or aluminum. Accordingly, even when object 400 is a highly reflective material that reflects a second laser beam, such as copper, gold, or aluminum, the highly reflective material is subjected to preliminary heating with the first laser beam, leading to an increased absorptivity of the highly reflective material for the second laser beam. Accordingly, the highly reflective material can be processed with the first laser beam.

Laser apparatus 10 employs a configuration in which condensing lens 300 and focusing lens 212 are shifted from each other in the Z-axis direction. Accordingly, a designer or the like of laser apparatus 10 can design (manufacture) laser apparatus 10 while adjusting a beam profile of an infrared laser beam and blue laser beams. In other words, the designer or the like can adjust the beam profile of an infrared laser beam and blue laser beams in manufacture of laser apparatus 10.

[Process of Controller]

Figure 11:
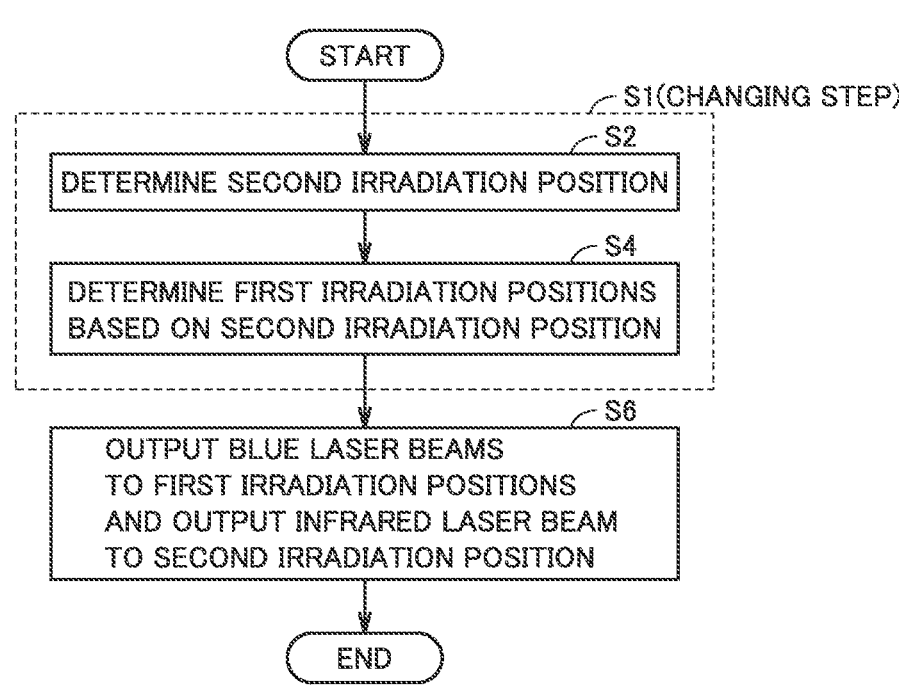
FIG. 11 is a flowchart showing an example processing procedure performed by a controller 500.

FIG. 11 is a flowchart showing an example processing procedure performed by controller 500. First, at step S1, controller 500 changes the relative positional relationship and the individual positions described above based on an input operation to input device 502 by the user. Step S1 includes steps S2 and S4, which will be described below.

At step S2, controller 500 determines a second irradiation position based on an instruction to input device 502 from the user. At S4, controller 500 then determines a first irradiation position based on the irradiation pattern described above and the second irradiation position determined at step S2.

At step S6, controller 500 then causes the first laser device to irradiate the determined first irradiation position with the blue laser beams. At step S6, controller 500 causes second laser device 201 to irradiate the determined second irradiation position with the infrared laser beam. At step S6, when the second pattern is selected, controller 500 first causes the first laser device to irradiate the first irradiation position with the blue laser beams, and then, causes second laser device 201 to irradiate the first irradiation positions, which have been irradiated with the blue laser beams, with the infrared laser beam. Through such processing, laser apparatus 10 can irradiate the positions, which have been subjected to preliminary heating with the blue laser beams, with the infrared laser beam for main heating.

An example in which controller 500 performs processing of step S6 after processing of step S1 has been described as the example of FIG. 11. However, controller 500 may perform processing of step S1 during execution of step S6 (i.e., during output of the infrared laser beam and the blue laser beams).

[Variations]

Figure 12:
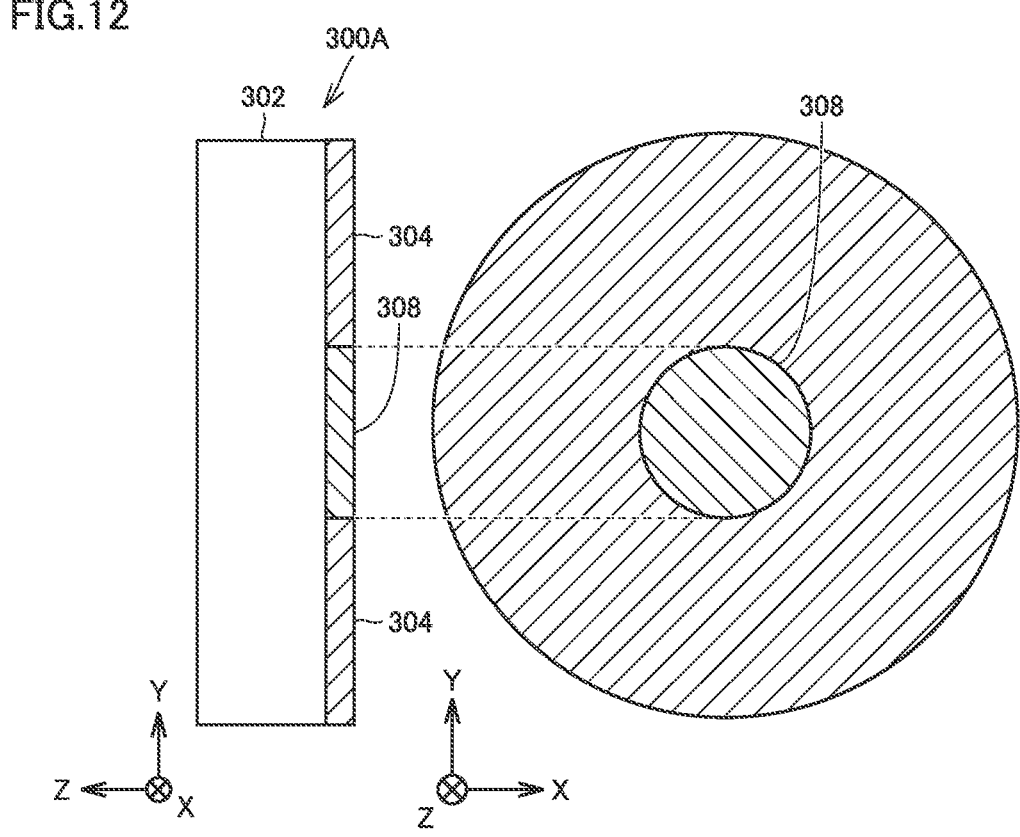
FIG. 12 shows a variation of the condensing lens.

(1) In the example of FIG. 4, description has been given of a configuration in which hole 306 is formed in condensing lens 300 as the pass-through portion that causes an infrared laser beam to pass therethrough. However, the pass-through portion may have any configuration that causes an infrared laser beam to pass therethrough. FIG. 12 shows a condensing lens 300A of a variation. Condensing lens 300A includes lens body 302, first layer 304 formed on a surface of lens body 302, and a second layer 308 formed on the surface of lens body 302. Second layer 308 corresponds to a "pass-through coating" of the present disclosure. Second layer 308 is a layer having a low reflectivity of an infrared laser beam. Second layer 308 is formed through lamination of tantalum pentoxide ($TaO_2$) and silicon dioxide ($SiO_2$). The lamination number may be one or not less than two.

Even the configuration of condensing lens 300A as shown in FIG. 12 can cause an infrared laser beam to pass therethrough appropriately.

(2) The embodiment has described a configuration in which laser apparatus 10 includes actuators. However, laser apparatus 10 may employ a configuration including no actuators. In this case, the user may manually change the irradiation positions of the blue laser beams in object 400 while holding the first laser device. In other words, the user may change the relative positional relationship manually.

The embodiment has described a configuration in which program data for execution of the first to fourth patterns as the irradiation pattern is stored in advance. However, a configuration in which such program data is not stored may be employed. In the case of such a configuration, for example, the user may finely adjust the irradiation directions of the first laser device and the second laser device to achieve at least one pattern of the first to fourth patterns.

(3) The embodiment has described a configuration in which laser apparatus 10 includes condensing lens 300. However, laser apparatus 10 may include no condensing lens 300. For example, a configuration may be employed in which the respective blue laser beams from first laser devices 101 to 106 and the infrared laser beam from second laser device 201 are directly applied to object 400.

(4) The embodiment has described a configuration in which a plurality of (six) first laser devices are provided and one second laser device is provided. However, one first laser device and one second laser device may be provided. In such a configuration, the relative positional relationship between the first irradiation position of the blue laser beam in object 400 and the second irradiation position of the infrared laser beam in object 400 is changeable. Accordingly, the beam profile can be adjusted.

Alternatively, one first laser device may be provided, and a plurality of second laser devices may be provided. In such a configuration, at least one of the relative positional relationship between the first irradiation position of the blue laser beam in object 400 and the respective second irradiation positions of the plurality of second laser beams in object 400 and each of the plurality of second irradiation positions is changeable. Accordingly, the beam profile can be adjusted.

[Aspects]

It will be appreciated by a person skilled in the art that the exemplary embodiments described above provide specific examples of the following aspects.

(Clause 1) A laser apparatus according to an aspect includes first light sources that output respective first laser beams for preliminary heating of an object, and a second light source that outputs a second laser beam for main heating of the object. At least one of a relative positional relationship and each of respective first irradiation positions of the first laser devices is changeable, the relative positional relationship being a relative positional relationship between the respective first irradiation positions of the first laser beams in the object and a second irradiation position of the second laser beam in the object.

The laser apparatus according to clause 1 can change at least one of the relative positional relationship between the respective first irradiation positions of the first laser beams in the object and the second irradiation position of the second laser beam in the object, and each of the first irradiation positions. Thus, a beam profile can be adjusted.

(Clause 2) The laser apparatus according to clause 1 further includes a controller that changes the relative positional relationship.

With the laser apparatus according to clause 2, the controller changes the relative positional relationship, thus reducing a burden on a user.

(Clause 3) The laser apparatus according to clause 2 further includes an input device that receives an input of an irradiation pattern from a user, and the controller changes at least one of the relative positional relationship and each of the first irradiation positions based on the irradiation pattern.

The relative positional relationship is changed based on the irradiation pattern selected by the user, leading to improved user's convenience.

(Clause 4) The laser apparatus according to clause 3 further includes an optical element that splits the second laser beam into parts. The irradiation pattern includes a pattern in which respective positions corresponding to the split parts of the second laser beam are irradiated with some of the first laser beams.

The laser apparatus according to clause 3 can concurrently process objects.

(Clause 5) In the laser apparatus according to clause 3 or 4, the at least one irradiation pattern includes a pattern in which the object is irradiated with one or more of the first laser beams, and subsequently, the first irradiation positions irradiated with the one or more of the first laser beams are irradiated with the second laser beam.

The laser apparatus according to clause 5 can perform preliminary heating of the object with the first laser beams and then perform main heating of the object with the second laser beam. Thus, even an object which has a high reflectivity of the second laser beam can be subjected to main heating with the second laser beam.

(Clause 6) The laser apparatus according to any one of clauses 1 to 5 further includes a condensing lens that collects the first laser beams and causes the first laser beams to be applied to the object. The condensing lens has a pass-through portion that causes the second laser beam to pass therethrough, and the second laser beam that has passed through the pass-through portion is applied to the object.

The laser apparatus according to clause 6 can collect the first laser beams and the second laser beam by the condensing lens and irradiate the object with the collected laser beams.

(Clause 7) In the laser apparatus according to clause 6, the pass-through portion is a hole.

The laser apparatus according to clause 7 can cause the second laser beam to pass through the condensing lens.

(Clause 8) In the laser apparatus according to clause 6, the pass-through portion includes a pass-through coating for causing the second laser beam to pass therethrough.

The laser apparatus according to clause 8 can cause the second laser beam to pass through the condensing lens.

(Clause 9) In the laser apparatus according to any one of clauses 1 to 8, each of the first light sources is formed of a diode laser device.

The laser apparatus according to clause 9 can irradiate the object with the first laser beams by an existing diode laser device.

(Clause 10) In the laser apparatus according to any one of clauses 1 to 9, the second light source is formed of a single-mode fiber laser device.

The laser apparatus according to clause 10 can irradiate the object with the second laser beam by an existing single-mode fiber laser device.

(Clause 11) In the laser apparatus according to any one of clauses 1 to 10, each of the first laser beams is a laser beam having a wavelength of not less than 400 nm and not greater than 550 nm, the second laser beam is a laser beam having a wavelength of not less than 900 nm and not greater than 1100 nm, and the object is made of copper, gold, or aluminum.

The laser apparatus according to clause 11 can increase an absorptivity of even a highly reflective material which reflects the second laser beam for a second laser beam, such as copper, gold, or aluminum, because the highly reflective material is subjected to preliminary heating with the first laser beams. The highly reflective material can thus be processed with the first laser beams.

(Clause 12) A laser apparatus according to another embodiment includes a first light source that outputs a first laser beam for preliminary heating of an object, and a second light source that outputs a second laser beam for main heating of the object. A relative positional relationship between a first irradiation position of the first laser beam in the object and a second irradiation position of the second laser beam in the object is changeable.

The laser apparatus according to clause 12 can change the relative positional relationship between the first irradiation position of the first laser beam in the object and the second irradiation position of the second laser beam in the object. The beam profile can thus be adjusted.

(Clause 13) A laser apparatus according to another embodiment includes a first light source that outputs a first laser beam for preliminary heating of an object, and second light sources that output respective second laser beams for main heating of the object. At least one of a relative positional relationship and each of respective second irradiation positions of the second laser beams is changeable, the relative positional relationship being a relative positional relationship between a first irradiation position of the first laser beam in the object and the respective second irradiation positions of the second laser beams in the object.

The laser apparatus according to clause 13 can change at least one of the relative positional relationship between the first irradiation position of the first laser beam in the object and the respective second irradiation positions of the second laser beams in the object, and the position of each of the second irradiation positions. The beam profile can thus be adjusted.

(Clause 14) A laser apparatus according to another embodiment includes first light sources that output respective first laser beams for preliminary heating of an object, a second light source that outputs a second laser beam for main heating of the object, a first optical system that collects the first laser beams, and a second optical system that collects the second laser beam. The first optical system and the second optical system are shifted from each other in a direction of optical axis.

The laser apparatus according to clause 14 can adjust the beam profile, for example, in manufacture of the laser apparatus.

(Clause 15) A control method according to another aspect is a control method for a laser apparatus that processes an object. The control method includes outputting first laser beams for preliminary heating of the object, outputting a second laser beam for main heating of the object, and changing at least one of a relative positional relationship between respective first irradiation positions of the first laser beams in the object and a second irradiation position of the second laser beam in the object, and each of the first irradiation positions The control method according to clause 15 can change at least one of the relative positional relationship between the respective first irradiation positions of the first laser beams in the object and the second irradiation position of the second laser beam in the object, and each of the first irradiation positions. The beam profile can thus be changed.

(Clause 16) In the control method according to clause 15, the changing of the relative positional relationship includes determining the second irradiation position, and determining the first irradiation positions based on the determined second irradiation position.

The control method according to clause 16 can irradiate the position, subjected to preliminary heating with the first laser beams, with the second laser beam for main heating.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A laser apparatus comprising:
first light sources that output respective first laser beams to perform preliminary heating of respective first irradiation positions on an object;
a second light source that outputs a second laser beam to perform main heating of a second irradiation position on the object;
an input device that receives an input of an irradiation pattern from a user; and
a controller, wherein
the controller is configured to:
control the second light source to output the second laser beam to the second irradiation position after a predetermined period of time has elapsed since outputting the first laser beams for the preliminary heating; and
based on the irradiation pattern, change at least one of a relative positional relationship and the first irradiation positions of the first laser beams, the relative positional relationship being a relative positional relationship between the respective first irradiation positions of the first laser beams on the object and the second irradiation position of the second laser beam on the object.

2. The laser apparatus according to claim 1, further comprising an optical element that splits the second laser beam into parts,
wherein the irradiation pattern includes a pattern in which respective positions corresponding to the split parts of the second laser beam are irradiated with some of the first laser beams.

3. The laser apparatus according to claim 1, wherein the irradiation pattern includes a pattern in which the object is irradiated with one or more of the first laser beama, and subsequently, the first irradiation position irradiated with the one or more first laser beams are irradiated with the second laser beam.

4. The laser apparatus according to claim 1, further comprising a condensing lens that collects the first laser beams and causes the first laser beams to be applied to the object, wherein
the condensing lens has a pass-through portion that causes the second laser beam to pass therethrough, and
the second laser beam that has passed through the pass-through portion is applied to the object.

5. The laser apparatus according to claim 4, wherein the pass-through portion is a hole.

6. The laser apparatus according to claim 4, wherein the pass-through portion includes a pass-through coating for causing the second laser beam to pass therethrough.

7. The laser apparatus according to claim 1, wherein each of the first light sources is formed of a diode laser device.

8. The laser apparatus according to claim 1, wherein the second light source is formed of a single-mode fiber laser device.

9. The laser apparatus according to claim 1, wherein
each of the first laser beams is a laser beam having a wavelength of not less than 400 nm and not greater than 550 nm, and
the second laser beam is a laser beam having a wavelength of not less than 900 nm and not greater than 1100 nm.

10. A laser apparatus comprising:
first light sources that output respective first laser beams to perform preliminary heating of respective first irradiation positions on an object;
a second light source that outputs a second laser beam to perform main heating of a second irradiation position on the object;
an input device that receives an input of an irradiation pattern from a user; and
a controller, wherein
the controller is configured to:
control the second light source to output the second laser beam to the second irradiation position after a predetermined period of time has elapsed since outputting the first laser beams for the preliminary heating; and
based on the irradiation pattern, change a relative positional relationship between the first irradiation positions of the first laser beams on the object and the second irradiation position of the second laser beam.

11. A laser apparatus comprising:
first light sources that output respective first laser beams to perform preliminary heating of respective first irradiation positions on an object;
second light sources that output respective second laser beams to perform main heating of respective second irradiation positions on the object;
an input device that receives an input of an irradiation pattern from a user; and
a controller, wherein
the controller is configured to:
control the second light sources to output the second laser beams to the second irradiation positions after a predetermined period of time has elapsed since outputting the first laser beams for the preliminary heating; and
based on the irradiation pattern, change at least one of a relative positional relationship and each of the respective second irradiation positions of the second laser beams, the relative positional relationship being a relative positional relationship between the respective first irradiation positions of the first laser beams on the object and the respective second irradiation positions of the second laser beams on the object.

12. A laser apparatus comprising:
first light sources that output respective first laser beams to perform preliminary heating of respective first irradiation positions on an object;
a second light source that outputs a second laser beam to perform main heating of a second irradiation position on the object;
a first optical system that collects the first laser beams;
a second optical system that collects the second laser beam;
an input device that receives an input of an irradiation pattern from a user; and
a controller,
wherein the controller is configured to:

control the second light source to output the second laser beam to the second irradiation position after a predetermined period of time has elapsed since outputting the first laser beams for the preliminary heating, and based on the irradiation pattern, change at least one of a relative positional relationship and the first irradiation positions of the first laser beams, the relative positional relationship being a relative positional relationship between the respective first irradiation positions of the first laser beams on the object and the second irradiation position of the second laser beam on the object, and wherein the first optical system and the second optical system are shifted from each other in a direction of an optical axis.

13. A control method for a laser apparatus that processes an object, the control method comprising:

outputting first laser beams to perform preliminary heating of respective first irradiation positions on the object;

outputting a second laser beam to perform main heating of a second irradiation position on the object;

outputting the second laser beam to the second irradiation position, after a predetermined period of time has elapsed since outputting the first laser beam for the preliminary heating;

inputting a first irradiation pattern; and based on the irradiation pattern, changing at least one of a relative positional relationship between the respective first irradiation positions of the first laser beams on the object and the second irradiation position of the second laser beam on the object, and the first irradiation positions.

14. The control method according to claim 13, wherein the changing of the relative positional relationship includes determining the second irradiation position, and determining the first irradiation positions based on the determined second irradiation position.

* * * * *